United States Patent
Celinder et al.

(10) Patent No.: US 10,372,389 B2
(45) Date of Patent: Aug. 6, 2019

(54) SYSTEMS AND METHODS FOR PRINTER MAINTENANCE OPERATIONS

(71) Applicant: Datamax-O'Neil Corporation, Orlando, FL (US)

(72) Inventors: Thomas Axel Jonas Celinder, Singapore (SG); Erik Karl Henning Unemyr, Singapore (SG)

(73) Assignee: Datamax-O'Neil Corporation, Orlando, FL (US)

(*) Notice: Subject to any disclaimer, the term of this patent is extended or adjusted under 35 U.S.C. 154(b) by 0 days.

(21) Appl. No.: 15/712,367

(22) Filed: Sep. 22, 2017

(65) Prior Publication Data

US 2019/0095148 A1    Mar. 28, 2019

(51) Int. Cl.
G06F 3/12 (2006.01)
G06F 11/00 (2006.01)
G03G 15/00 (2006.01)
H04N 1/32 (2006.01)

(52) U.S. Cl.
CPC ......... *G06F 3/1229* (2013.01); *G03G 15/553* (2013.01); *G06F 3/121* (2013.01); *G06F 3/1293* (2013.01); *G06F 11/008* (2013.01); *H04N 1/32609* (2013.01)

(58) Field of Classification Search
None
See application file for complete search history.

(56) References Cited

U.S. PATENT DOCUMENTS

| | | | |
|---|---|---|---|
| 6,106,088 A | 8/2000 | Wafler | |
| 6,161,913 A | 12/2000 | Childers et al. | |
| 6,427,053 B1* | 7/2002 | Eck | G03G 15/55 358/1.14 |
| 6,568,780 B2 | 5/2003 | Schantz et al. | |
| 6,714,744 B2* | 3/2004 | Arima | B41J 2/17566 399/23 |

(Continued)

FOREIGN PATENT DOCUMENTS

JP    2014131178    12/2014
WO    2013163789 A1    11/2013

*Primary Examiner* — Henok Shiferaw
(74) *Attorney, Agent, or Firm* — Additon, Higgins & Pendleton, P.A.

(57) ABSTRACT

The present disclosure is generally directed to systems and methods for executing various types of maintenance operations upon various types of printers. The maintenance operations can include preemptive actions that are taken upon a printer that is being operated in a certain environment, the preemptive actions based on evaluating operational statistics associated with a set of similar printers operated in a similar environment. The operational statistics, which are automatically accumulated over a period of time for various printers under various operating conditions, can be implemented in various ways, such as in the form of behavioral models and/or predictive models. In some embodiments, the behavioral models and/or predictive models indicate an expected-time-to-failure of a component when a printer is operated in a certain environment. The expected-time-to-failure information can be utilized to execute preemptive printer maintenance operations such as scheduling a replacement of the component ahead of the expected-time-to-failure.

20 Claims, 6 Drawing Sheets

(56) References Cited

U.S. PATENT DOCUMENTS

| | | |
|---|---|---|
| 6,832,725 B2 | 12/2004 | Gardiner et al. |
| 7,127,185 B2 | 10/2006 | Doty et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |

(56) References Cited

U.S. PATENT DOCUMENTS

| | | |
|---|---|---|
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |

(56) References Cited

U.S. PATENT DOCUMENTS

| | | |
|---|---|---|
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2004/0246520 A1* | 12/2004 | Obert .............. G03G 15/55 358/1.15 |
| 2005/0027486 A1* | 2/2005 | Kitada .............. G06F 3/1207 702/185 |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0208307 A1* | 8/2010 | Soda .............. H04N 1/32609 358/437 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168787 A1 | 6/2014 | Wang et al. |
| 2014/0175165 A1 | 6/2014 | Havens et al. |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0132017 A1* | 5/2015 | Imazeki .............. G03G 15/553 399/24 |
| 2015/0133047 A1 | 5/2015 | Smith et al. |
| 2015/0134470 A1 | 5/2015 | Hejl et al. |
| 2015/0136851 A1 | 5/2015 | Harding et al. |

(56) References Cited

U.S. PATENT DOCUMENTS

| | | |
|---|---|---|
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Percorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0350725 A1* | 12/2016 | Arthur .................. G06Q 20/18 |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschinie et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |

(56) References Cited

U.S. PATENT DOCUMENTS

| | | |
|---|---|---|
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |
| 2017/0352204 A1* | 12/2017 | Huet .................. G05B 23/0283 |

* cited by examiner

| Projected Printer Failures (90% confidence) | Jul | Aug | Sep | Oct | Nov | Dec |
|---|---|---|---|---|---|---|
| Freezer Room | 0.6 | 2.0 | 2.4 | 5.0 | 5.0 | 7.0 |
| Warehouse | 0.1 | 0.2 | 0.8 | 2.3 | 2.8 | 4.0 |
| Office Area | 1.8 | 2.6 | 3.8 | 4.6 | 6.2 | 7.4 |
| Loading Dock | 3.2 | 6.8 | 12.1 | 16.1 | 24.3 | 28.6 |

FIG. 3

SYSTEMS AND METHODS FOR PRINTER MAINTENANCE OPERATIONS

FIELD OF THE INVENTION

The present invention generally relates to printers and more particularly relates to systems and methods for printer maintenance operations.

BACKGROUND

Printers are ubiquitously used in a wide variety of applications and environments. The wear and tear upon the components of each printer depends on various factors such as the quality of the components, the amount of printing jobs that are executed on the printer, and the nature of the environment in which the printer is used. As for the nature of the environment in which a printer is used, some printers are used in an office environment where printer usage can be high but the environment in which the printers are located is relatively hospitable in terms of temperature and humidity. Some other printers may be used in an industrial environment where printer usage may be relatively low but the environment in which the printers are located may be harsh (for example, a factory floor that is dusty, hot, and/or humid). Consequently, the amount of wear and tear and the nature of the wear and tear, encountered by components of printers, even when the printers are identical to each other, can vary widely depending upon how and where they are used.

Typically, the condition of a printer is ignored by most users until the printer malfunctions (paper jam, defective printout quality, unusual noise, etc.). Remedial action to address printer issues is thus mostly reactive in nature rather than proactive and is often executed manually by a user of the printer or by designated maintenance personnel. Furthermore, in some cases, the remedial action may be delayed due to lack of availability of a spare part as a result of poor planning, thereby forcing the printer to be placed out of service for an unnecessarily long period of time.

In many cases, even when preventive maintenance is carried out by designated maintenance personnel, various actions that are taken by such personnel are often based on experience and guesswork rather than on quantifiable parameters. For example, maintenance personnel of a large corporation may routinely replace certain components of a set of printers (a thermal printhead or a platen roller, for example) on a routine, periodic basis without taking into consideration the operating conditions of individual printers and/or other data that may be pertinent to individual printers in the set of printers. As can be understood, such an action is neither efficient in terms of personnel usage nor in terms of incurred expenses.

SUMMARY

In an exemplary embodiment in accordance with the disclosure, a method includes determining a current operating status of a printer; identifying a failure statistic associated with the current operating status of the printer, the failure statistic comprising an expected-time-to-failure of a first component of the printer; and scheduling a replacement of the first component of the printer based at least in part, on the expected-time-to-failure of the first component.

In another exemplary embodiment in accordance with the disclosure, a method includes deriving a first behavioral model based on operating conditions of a first set of printers; deriving a second behavioral model based on operating conditions of a second set of printers; determining a current operating status of a printer; associating the printer with one of the first behavioral model or the second behavioral model based on the current operating status of the printer; determining from the associated one of the first behavioral model or the second behavioral model, a failure statistic comprising an expected-time-to-failure of a first component of the printer; and scheduling a replacement of the first component of the printer based on the expected-time-to-failure of the first component.

In yet another exemplary embodiment in accordance with the disclosure, a non-transitory computer-readable storage medium contains instructions executable by a processor for performing operations such as: utilizing sensor data received from one or more sensors to determine a current operating status of a printer; identifying a failure statistic associated with the current operating status of the printer, the failure statistic comprising an expected-time-to-failure of a first component of the printer; and scheduling a replacement of the first component of the printer based on the expected-time-to-failure of the first component.

The foregoing illustrative summary, as well as other exemplary objectives and/or advantages described in this disclosure, and the manner in which the same are accomplished, are further explained within the following detailed description and its accompanying drawings.

BRIEF DESCRIPTION OF THE DRAWINGS

FIG. 3 shows an exemplary table that provides data pertaining to projected printer failures in accordance with an exemplary embodiment of the disclosure.

DETAILED DESCRIPTION

Figure 1:
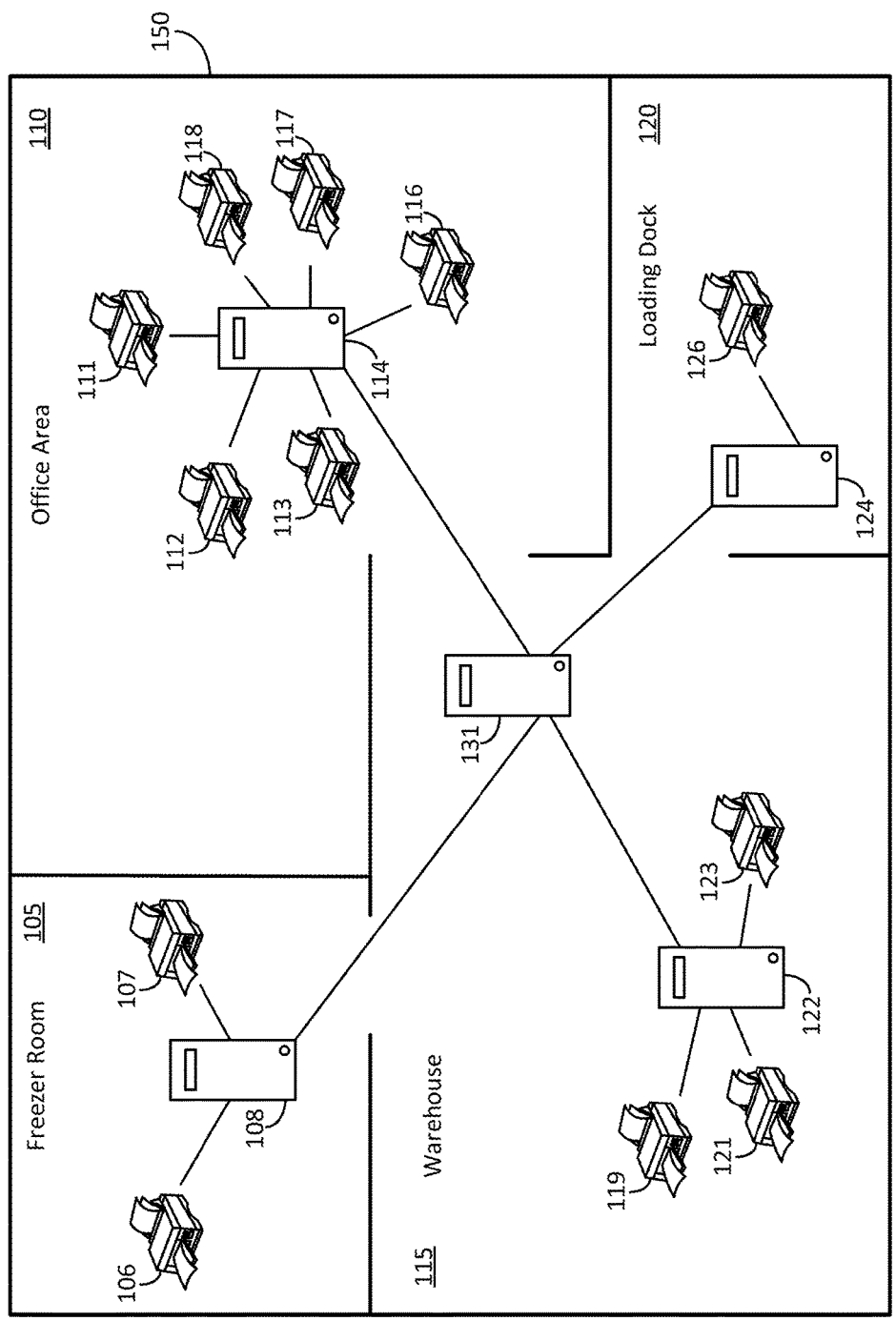
FIG. 1 schematically depicts an exemplary system for executing printer maintenance operations upon a number of printers located in a facility, in accordance with an exemplary embodiment of the disclosure.

Throughout this description, embodiments and variations are described for the purpose of illustrating uses and implementations of inventive concepts. The illustrative description should be understood as presenting examples of inventive concepts, rather than as limiting the scope of the concepts as disclosed herein. Towards this end, certain words and terms are used herein solely for convenience and such words and terms should be broadly understood as encompassing various objects and actions that are generally understood in various forms and equivalencies by persons of ordinary skill in the art. For example, the words "set" and "group" as used herein can be used interchangeably in some cases, the words "condition," "status" and "environment" as used herein can be interpreted in an interchangeable manner based on the context in which used, the word "similar" as use herein indicates similarity between two objects in a broad sense (for example, among a group of laser jet printers or among a group of ink jet printers). Furthermore, in various embodiments, the word "similar" when used with respect to two or more devices, components, or environments, can indicate an exact match or a substantially close match between each other of the two or more devices, components, or environments. Thus, for example, the word "similar" can be used to refer to two or more identical or substantially identical laser jet printers, two or more identical or substantially identical inkjet printer printers, or two or more identical or substantially identical printheads. The word "similar" can also be used with reference to two or more identical printer models, two or more printers manufactured by the same manufacturer, two or more environments (equally cold, equally humid, equally hot etc.). The word "example" as used herein is intended to be non-exclusionary and non-limiting in nature. More particularly, the word "exemplary" as used herein indicates one among several examples and it should be understood that no special emphasis, exclusivity, or preference, is associated or implied by the use of this word.

The present disclosure is generally directed to systems and methods for executing various types of maintenance operations upon various types of printers. The maintenance operations can include preemptive actions that are taken upon a printer that is being operated in a certain environment, the preemptive actions based on evaluating operational statistics associated with a set of similar printers operated in a similar environment. The operational statistics, which are automatically accumulated over a period of time for various printers under various operating conditions, can be implemented in various ways, such as in the form of behavioral models and/or predictive models. In some embodiments, the behavioral models and/or predictive models indicate an expected-time-to-failure of a component when a printer is operated in a certain environment. The expected-time-to-failure information can be utilized to execute preemptive printer maintenance operations such as scheduling a replacement of the component ahead of the expected-time-to-failure.

While human beings would carry out certain maintenance operations based on guesswork and limited information derived from a few printers, the operational statistics that are utilized in accordance with the disclosure, are accumulated and processed by utilizing data obtained via sensors and other automated data collecting instrumentation coupled to a large number of computers (for example, more than 100 computers). Such data is too voluminous and complex for collection and interpretation by human beings.

FIG. 1 schematically depicts an exemplary system for executing printer maintenance operations upon a number of printers located in a facility, in accordance with an exemplary embodiment of the disclosure. The system, which is deployed in an industrial facility 150 (an exemplary location used here for purposes of description), includes a first computer 108 coupled to a first set of printers, a second computer 114 coupled to a second set of printers, a third computer 122 coupled to a third set of printers, and a fourth computer 124 coupled to a single computer. Each of the first computer 108, the second computer 114, the third computer 122, and the fourth computer 124 is communicatively coupled to a server 131. The server 131 can be communicatively coupled to a communications network such as the Internet (not shown). It should be understood that the number of computers, the number of printers, and the interconnections between these various devices is used here merely for purposes of description. Other configurations and numbers of devices can be utilized in other embodiments. For example, in one alternative embodiment, one or more printers can be coupled to a stand-alone computer, the stand-alone computer configured to independently execute the various operations disclosed herein in accordance with the disclosure.

The first computer 108, which is coupled to the first set of printers (printer 106 and printer 107), is located in a freezer room 105 of the industrial facility 150. Consequently, printer 106 and printer 107 are both exposed to a harsh, cold environment that stresses the components of printer 106 and printer 107 and reduces a mean time between failures (MTBF) of the components. The MTBF of various components can be determined based on operational data collected from printers that are already in operation in various environments and/or based on test data collected from printers operated in a test facility. The test facility can include a climate controlled chamber in which a set of printers are placed and the chamber set in accordance with various environmental conditions (heat, cold, humidity etc.)

In an exemplary data collection process in accordance with the disclosure, operational statistics associated with printer 106 and printer 107 are collected by monitoring each of printer 106 and printer 107 over a period of time. The collection can be carried out by utilizing various sensors such as a temperature sensor, a humidity sensor, a chemical sensor, an electrical sensor, a time-of-use sensor, a usage counter, an ink level detector, and a contaminant detector. The operational statistics can also include various parameters associated with components that are inherent to each of the printer 106 and printer 107 (printhead, body, drum unit, motor etc.) and/or elements that are introduced into each of the printer 106 and printer 107 (print media such as paper, plastic, and fabric, ink, toner etc.). Parameters associated with the print media can include surface texture, porosity, and thickness for example. Parameters associated with ink and toner can include viscosity, density, dryness, and wetness for example. Irrespective of the manner by which collected, the operational statistics can be utilized to generate a behavioral model and/or a predictive model in accordance with the disclosure.

In an exemplary evaluation process in accordance with the disclosure, operational statistics collected from a different set of printers (not shown) are utilized for evaluating one or both of printer 106 and printer 107 and carrying out preemptive printer maintenance operations. The other (different) set of printers (not shown) would typically be identical to, or similar to, at least one of the printer 106 or printer 107, and have been evaluated when in operation in environmental conditions that are identical to, or similar to, the environmental condition present in the freezer room 105 of the industrial facility 150. The other set of printers (not shown) can include several subsets of printers, each subset of printers providing operational statistics that are obtained by carrying out evaluations upon each printer when located in an environmental condition that is identical to, or substantially similar to, the environmental condition present in the freezer room 105 of the industrial facility 150.

For example, the other set of printers (not shown) from which operational statistics are obtained can include a first subset of two printers evaluated when in operation in a freezer room of a restaurant, a second subset of fifty printers evaluated when transported in a freezer portion of a truck, and a third subset of twenty printers evaluated in a climate controlled chamber of a research facility.

The second computer 114, which is coupled to the second set of printers (printer 111, printer 112, printer 113, printer 116, printer 117, and printer 118), is located in an office area 110 of the industrial facility 150. Each of this second set of printers is exposed to a climate-controlled environment that is relatively hospitable and does not stress the components of these printers as much in comparison to printer 106 and printer 107 located in the freezer room 105. Consequently, the MTBF of the second set of printers located in the office area 110 is relatively longer than the MTBF of the first set of printers located in the freezer room 105. Operational statistics of the second set of printers can be collected in a manner similar to the exemplary data collection process described above with reference to the first set of printers. The second set of printers can be evaluated by utilizing operational statistics in a manner similar to the exemplary evaluation process described above with reference to the first set of printers. In this case though, the other set of printers (not shown) from which operational statistics are obtained can include a first subset of forty printers evaluated when in operation in an office of a large corporation, a second subset of fifty printers evaluated when stored in a climate-controlled store room, and a third subset of twenty printers evaluated in a climate controlled chamber of a research facility.

The third computer 122, which is coupled to the third set of printers (printer 119, printer 121, and printer 123), is located in a warehouse 115 of the industrial facility 150. Each of this third set of printers is exposed to a non-air-conditioned environment that is friendlier than the freezer room 105 but not as friendly as the office area 110. However, the amount of usage of the third set of printers in the warehouse 115 is lower than that of the second set of printers in the office area 110. Consequently, the MTBF of the third set of printers is relatively longer than the MTBF of the first set of printers as well as the MTBF of the second set of printers. Operational statistics of the third set of printers can be collected in a manner similar to the exemplary data collection process described above with reference to the first set of printers. The third set of printers can be evaluated by utilizing operational statistics in a manner similar to the exemplary evaluation process described above with reference to the first set of printers. In this case though, the other set of printers (not shown) from which operational statistics are obtained can include a first subset of sixty printers evaluated when in operation in a warehouse of a manufacturing facility and a second subset of twelve printers evaluated when stored in the warehouse of the manufacturing facility.

The fourth computer 124, which is coupled to a single printer (printer 126), is located in a loading dock 120 of the industrial facility 150. The single printer is exposed to a hot, humid, and dusty environment that is relatively unfriendly in comparison to the office area 110 but friendlier than the freezer room 105. Consequently, the MTBF of the printer 126 is longer than the MTBF of the first set of printers located in the freezer room 105 but shorter than the MTBF of the second set of printers located in the office area 110. Operational statistics of the fourth printer can be ignored because obtaining such statistics from a single computer may not be useful for applying to a larger printer population. However, the fourth printer can be evaluated by utilizing operational statistics in a manner similar to the exemplary evaluation process described above with reference to the first set of printers. In this case, the other set of printers (not shown) from which operational statistics are obtained can include a first subset of two printers evaluated when in operation in a loading dock of a factory, a second subset of thirteen printers evaluated when in operation in a loading dock of a transport facility, and a third subset of sixty printers when located at a loading dock of a customs facility.

Figure 2:
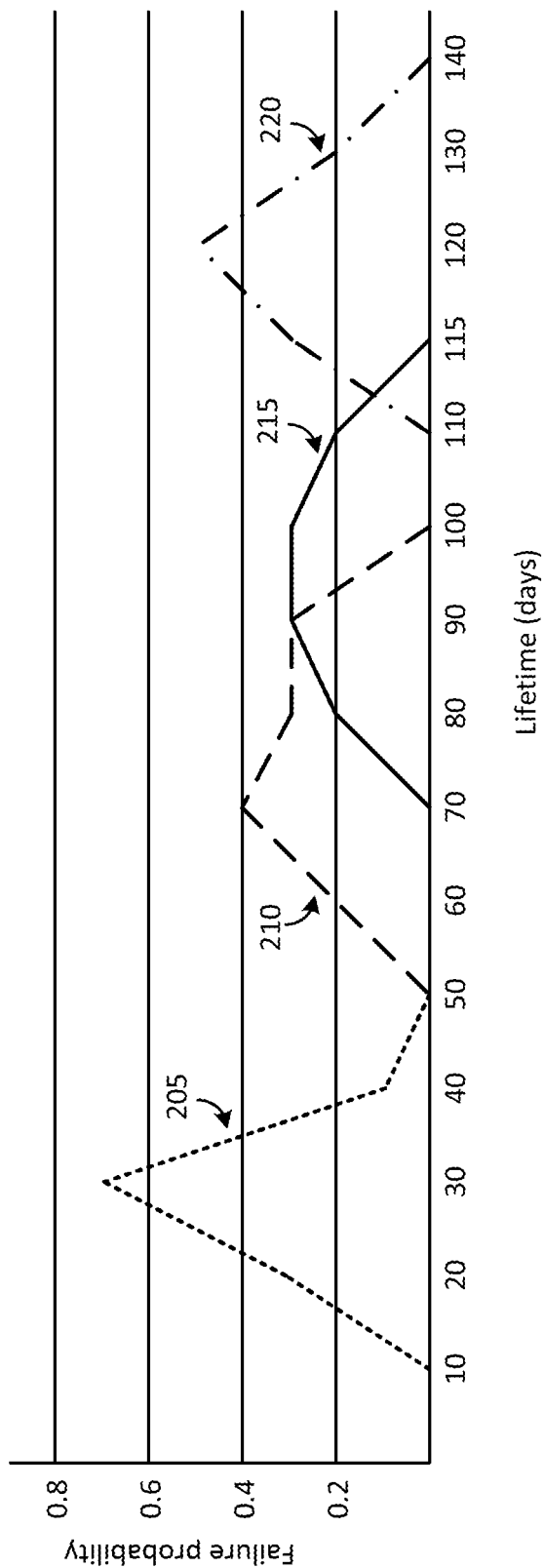
FIG. 2 depicts an exemplary graphical representation indicating probability of failure versus lifetime for various sets of printers when operated in various types of environments.

FIG. 2 depicts an exemplary graphical representation indicating probability of failure versus lifetime for various sets of printers when operated in various types of environments. Each of the various graphical plots shown in the exemplary graphical representation can represent a behavioral model and/or a predictive model that is derived by evaluating a set of printers in a location having a distinct environment. An end-user, such as a business owner, can decide which graphical representation best matches an operating environment in which one or more of his printers are operated or can create a behavioral model and/or a predictive model that more closely matches his particular operating environment.

Graphical plot 205 represents a probability of failure versus lifetime relationship that can be applicable to the first set of printers (printer 106 and printer 107) located in the freezer room 105. Graphical plot 210 represents a probability of failure versus lifetime relationship that can be applicable to the fourth printer 126 located in the loading dock 120. Graphical plot 215 represents a probability of failure versus lifetime relationship that can be applicable to the second set of printers (printer 111, printer 112, printer 113, printer 116, printer 117, and printer 118) located in the office area 110. Graphical plot 220 represents a probability of failure versus lifetime relationship that can be applicable to the third set of printers (printer 119, printer 121, and printer 123) located in the warehouse 115.

Graphical plot 205, which can be a predictive model or a behavioral model, indicates a relatively high probability of failure versus lifetime due to a harsh environment similar to the freezer room 105. For example, graphical plot 205 indicates that there is a 0.7 probability of failure of either printer 106 or printer 107 upon reaching a lifetime of 30 days. Thus, based on knowledge of the date of installation and starting of use of the printer 106, the graphical plot 205 can be utilized to determine that the printer 106 has a 0.7 probability of failure in the next five days as a result of having been in operation for 25 days already. When the graphical plot pertains to a specific component of a printer, such as a printhead for example, the graphical plot 205 can be utilized to determine that the printhead in printer 106 has a 0.7 probability of failure in the next five days (expected-time-of-failure) as a result of having been used for 25 days already. Based on the expected-time-of-failure indicated by the graphical plot 205, a replacement of the printer 106 and/or a component of the printer 106 can be scheduled ahead of time before failure of the printer 106 and/or component in printer 106.

Graphical plot 210, which can be a predictive model or a behavioral model, indicates a relatively lower probability of failure versus lifetime in comparison to graphical plot 205 because the loading dock 120 provides a relatively better environment in comparison to the freezer room 105. The graphical plot 210 can be utilized in a manner similar to that described above with reference to the first set of printers to execute preemptive printer maintenance operations such as scheduling a replacement of a component ahead of the expected-time-of-failure.

Graphical plot 215, which can be a predictive model or a behavioral model, indicates a relatively lower probability of failure versus lifetime in comparison to graphical plot 205 because the office area 110 provides a more hospitable environment than the freezer room 105. The graphical plot 215 can be utilized in a manner similar to that described above with reference to the first set of printers to execute preemptive printer maintenance operations such as scheduling a replacement of a component ahead of the expected time of failure.

Graphical plot 220, which can be a predictive model or a behavioral model, indicates a relatively lower probability of failure versus lifetime in comparison to graphical plot 205 because the warehouse 115 provides a more hospitable environment than the freezer room 105. The graphical plot 220 can be utilized in a manner similar to that described above with reference to the first set of printers to execute preemptive printer maintenance operations such as scheduling a replacement of a component ahead of the expected time of failure.

FIG. 3 shows an exemplary table 300 that provides data pertaining to projected printer failures in accordance with an exemplary embodiment of the disclosure. Each of the various entries in the table 300 can be viewed as providing a behavioral model and/or a predictive model that is derived by evaluating a set of printers in a location having a distinct environment. The behavioral model and/or predictive model provides information pertaining to a history of failure characteristics and/or failure rates of one or more printers. In another embodiment in accordance with the disclosure, the table 300 can be used to provide data pertaining to projected failure rates of a component and/or components, such as a thermal printhead for example. Accordingly, the behavioral model and/or predictive model provides information pertaining to a history of failure characteristics and/or failure rates of a specific component and/or components in one type of printer for example.

A first row 305 of the table 300 indicates the failure probabilities of printers located in the freezer room 105 during various months of a year. A second row 310 of the table 300 indicates the failure probabilities of printers located in the warehouse 115 during various months of the year. A third row 315 of the table 300 indicates the failure probabilities of printers located in the office area 110 during various months of the year. A fourth row 320 of the table 300 indicates the failure probabilities of printers located in the loading dock 120 during various months of the year.

The table 300 can be utilized to schedule and evaluate replenishment orders of various printer components ahead of a failure so as to avoid understocking and cause for example, an interruption in manufacture or use.

Figure 4:
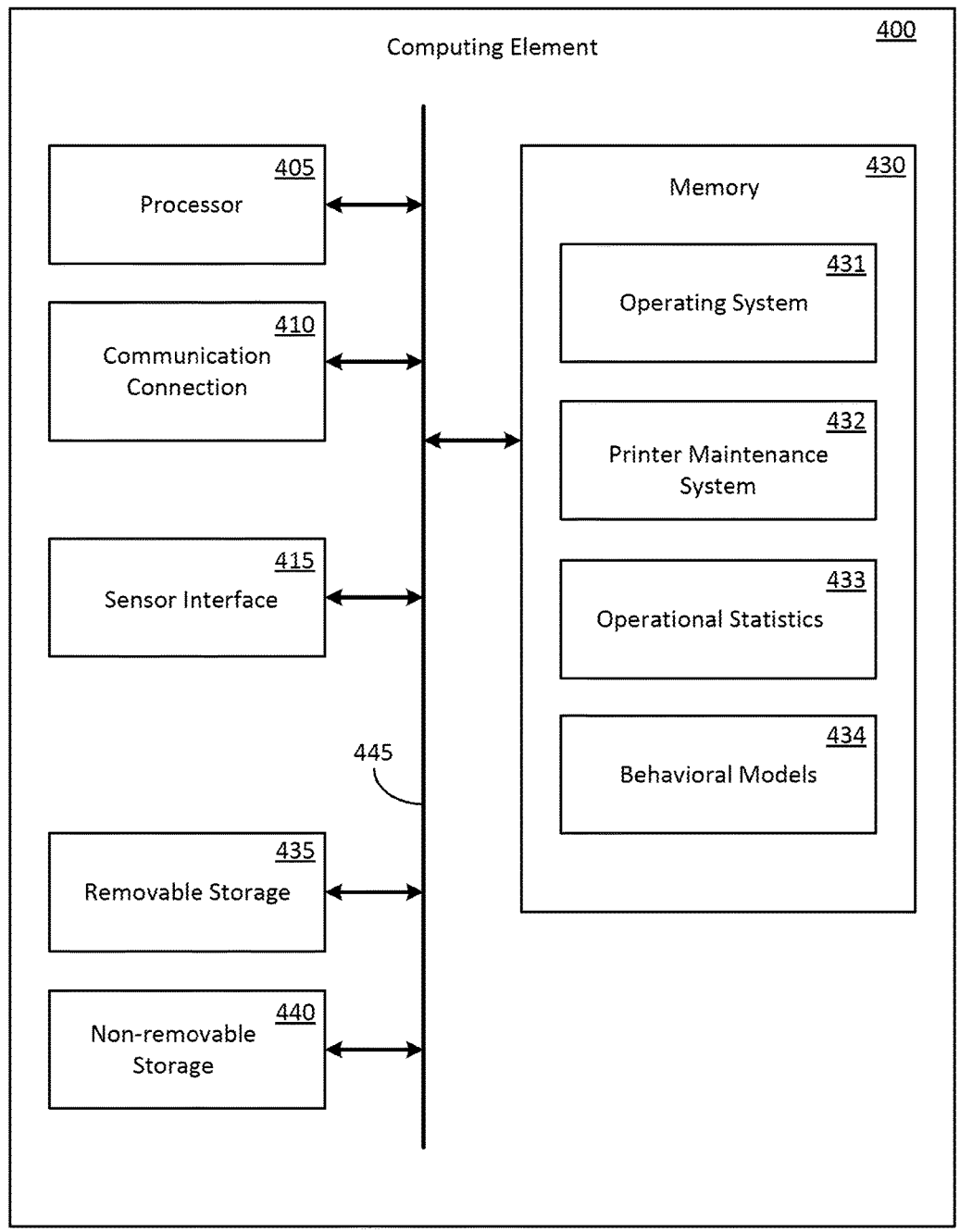
FIG. 4 shows an exemplary computing element that can be utilized for implementing printer maintenance operations in accordance with the disclosure.

FIG. 4 shows an exemplary computing element 400 that can be utilized for implementing and/or incorporating into one or more of the computers (such as the first computer 108 or the server 131) that fully, or in part, constitute the system depicted in FIG. 1. Generally, in terms of hardware components, computing element 400 can include a processor 405, a memory 430, a communication connection 410, a sensor interface 415, removable storage 435, and non-removable storage 440. These components are communicatively coupled to each other via a local interface 445, which can include address, control, and/or data connections to enable appropriate communications.

The processor 405 is a hardware device for executing software, particularly that stored in memory 430. The processor 405 can be any custom made or commercially available processor, a central processing unit (CPU), an auxiliary processor among several processors associated with the computing element 400, a semiconductor based microprocessor (in the form of a microchip or chip set), a macroprocessor, or generally any device for executing software instructions.

The memory 430 can include any one or a combination of volatile memory elements (e.g., random access memory (RAM, such as DRAM, SRAM, SDRAM, etc.)) and non-volatile memory elements (a ROM for example). The memory 430 can have a distributed architecture, where various components are situated remote from one another, but can be accessed by the processor 405.

The software in memory 430 may include one or more separate programs, each of which comprises an ordered listing of executable instructions for implementing logical functions. In the exemplary computing element 400, the software in the memory 430 includes an operating system 431, a printer maintenance system 432, operational statistics 433, and behavioral models 434. The operating system 431 essentially controls the execution of computer programs, such as embodied in the printer maintenance system 432, and provides input-output control, file and data management, memory management, and communication control and related services.

Printer maintenance system 432 may be implemented as a source program, an executable program (object code), a script, or any other entity comprising a set of instructions to be performed. When a source program, the program may be translated via a compiler, assembler, interpreter, or the like, which may or may not be included within the memory 430, so as to operate properly in connection with the operating system 431.

When the computing element 400 is in operation, the processor 405 is configured to execute software stored within the memory 430, to communicate data to and from the memory 430, and to generally control operations of the computing element 400 pursuant to the software. Various contents of the memory 430, including the printer maintenance system 432, the operating system 431, operational statistics 433, and behavioral models 434 in whole or in part, but typically the latter, are read by the processor 405, perhaps buffered within the processor 405, and utilized for executing the printer maintenance system 432.

When printer maintenance system 432 is implemented in software, it should be noted that the printer maintenance system 432 can be stored on any non-transitory computer readable storage medium for use by or in connection with any computer related system or method. In the context of this disclosure, a non-transitory computer readable storage medium is an electronic, magnetic, optical, or other physical device that contains or stores data and/or a computer program for use by or in connection with a computer-related system or method.

In an alternative embodiment, where a printer maintenance system in accordance with the disclosure is implemented in hardware, the printer maintenance system can be implemented with any or a combination of the following technologies, which are each well known in the art: a discrete logic circuit(s) having logic gates for implementing logic functions upon data signals, an application specific integrated circuit (ASIC) having appropriate combinatorial logic gates, a programmable gate array(s) (PGA), or a field programmable gate array (FPGA).

The communication connection 410 is configured to allow the computing element 400 to communicate with various devices such as printers and computers through a communications network such as a local area network or the Internet. The sensor interface 415 can be coupled to various sensors installed in one or more printers so as to permit collecting and storing of operational statistics 433 in the memory 430. The processor 405 can fetch the operational statistics 433 from the memory 430 and generate the behavioral models 434.

Figure 5:
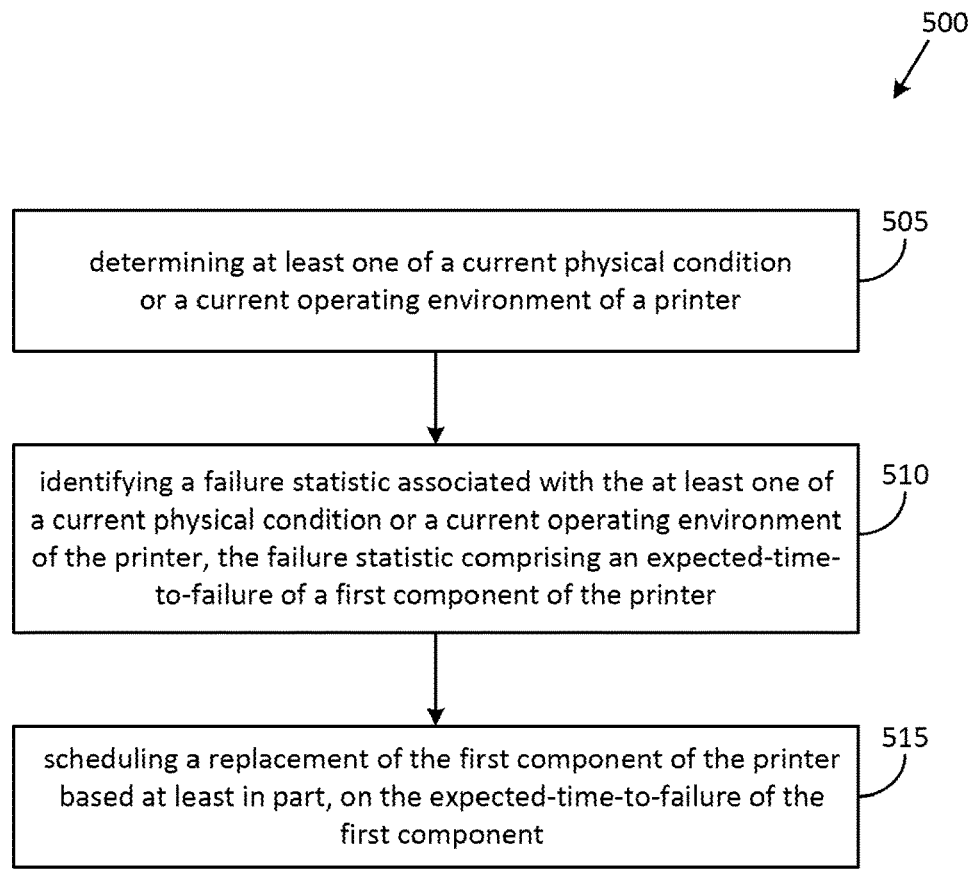
FIG. 5 shows a flowchart of an exemplary method for executing printer maintenance operations in accordance with the disclosure.

FIG. 5 shows a flowchart 500 of an exemplary method for executing printer maintenance in accordance with the disclosure. It is to be understood that any method steps or blocks shown in FIG. 5 (as well as in FIG. 6) may represent modules, segments, or portions of code that include one or more executable instructions for implementing specific logical functions or steps in the method. In certain implementations, one or more of the steps may be performed manually. It will be appreciated that, although particular example method steps are described below, additional steps or alternative steps may be utilized in various implementations without detracting from the spirit of the invention. Moreover, steps may be executed out of order from that shown or discussed, including substantially concurrently or in reverse order, depending on various alternative implementations. Code may be also contained in one or more printers, and may not be necessarily confined to any particular type of printer.

Block 505 of the flowchart 500 pertains to determining a current physical condition and/or a current operating environment of a printer, for example printer 106. One example of the operation shown in block 505 is executed by the computing element 400 via the use of sensors and the operational statistics 433 stored in memory 430. The operational statistics 433 can include information pertaining to dates and other data related to printer 106 that is not necessarily obtained via sensors.

Block 510 pertains to identifying a failure statistic associated with the current physical condition and/or a current operating environment of the printer 106, the failure statistic comprising an expected-time-to-failure of a first component of the printer. This operation can be carried out by the processor 405 in the computing element 400 by fetching and utilizing the operational statistics 433 and/or the behavioral models 434 stored in memory 430 to determine an expected-time-to-failure of the first component, such as a printhead of printer 106.

Block 515 pertains to scheduling a replacement of the first component based at least in part, on the expected-time-to-failure of the first component. This operation can be executed by the computing element 400 without human intervention. For example, the computing element 400 can automatically place an order or transmit a request to a supply source of the first component (such as a web-based business) based on the expected-time-to-failure of the first component.

The operations indicated in the flowchart 500 automate the maintenance process and eliminates guesswork, errors, and oversights that can take place when maintenance procedures are executed by humans, particularly when executed upon a large number of printers located in various types of environments. The operations indicated in the flowchart 500 also provides cost benefits by eliminating the need for keeping inventory for an unnecessarily long period of time and/or making unnecessary component purchases/replacements on some printers that have a longer MTBF than others, the variations in MTBF attributable to differing environmental conditions in which the various printers are operated.

Figure 6:
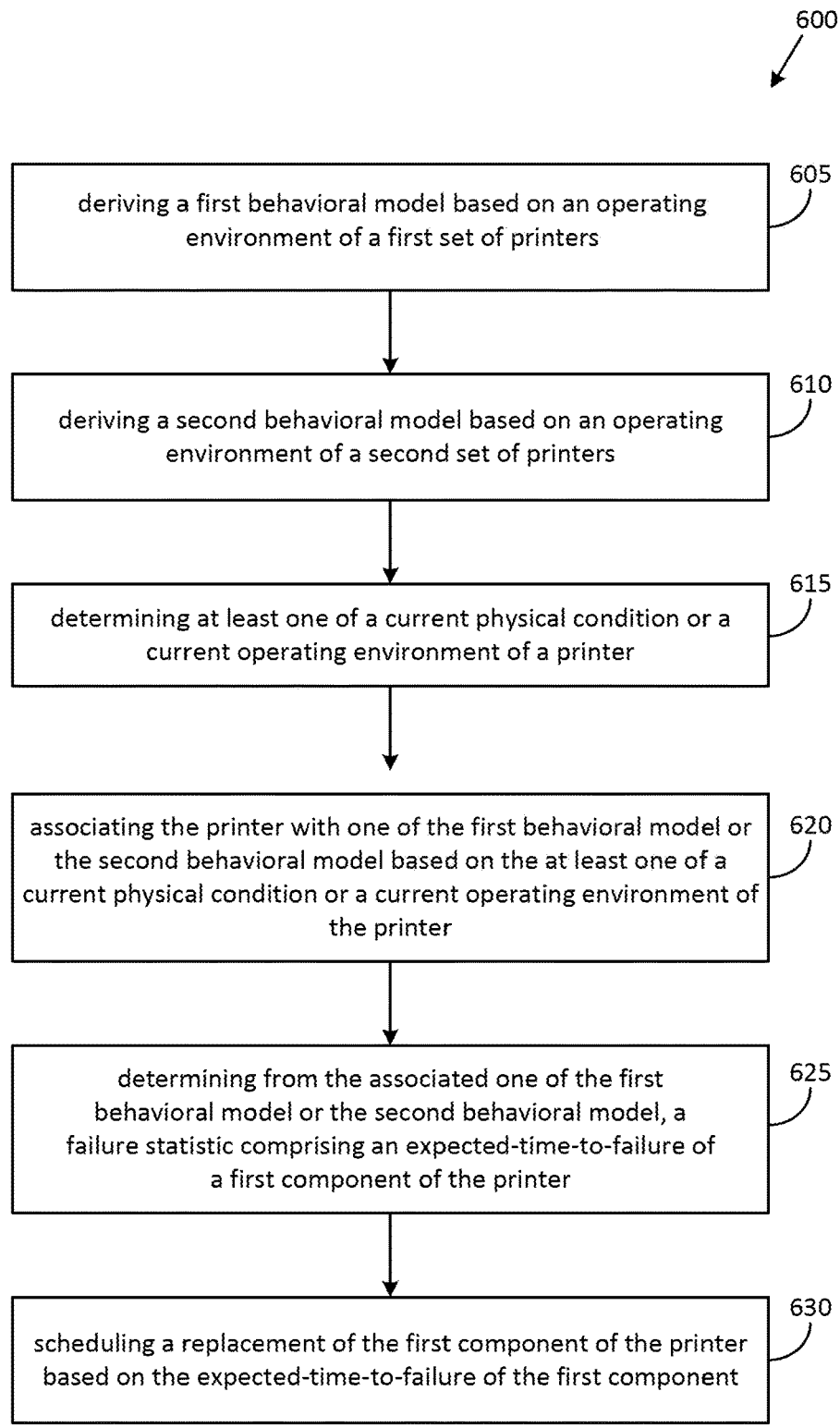
FIG. 6 shows a flowchart of another exemplary method for executing printer maintenance operations in accordance with the disclosure.

FIG. 6 shows a flowchart 600 of another exemplary method for executing printer maintenance in accordance with the disclosure. Block 605 of the flowchart 600 pertains to deriving a first behavioral model based on operating conditions of a first set of printers. This can be carried out for example by the computing element 400 evaluating and processing operating conditions and behavior of a first set of printers located in a first environment (for example an environment such as present in the freezer room 105). The computing element 400 can generate the first behavioral model in a format such as the ones shown in FIG. 2 and FIG. 3.

Block 610 of the flowchart 600 pertains to deriving a second behavioral model based on operating conditions of a second set of printers. This can be carried out for example by the computing element 400 evaluating and processing operating conditions and behavior of a second set of printers located in a second environment (for example an environment such as present in the office area 110). The computing element 400 can generate the second behavioral model in a format such as the ones shown in FIG. 2 and FIG. 3.

Block 615 of the flowchart 600 pertains to determining a current physical condition and/or a current operating environment of a printer, for example printer 106. One example of the operation shown in block 615 is executed by the computing element 400 via the use of sensors and the operational statistics 433 stored in memory 430. The operational statistics 433 provides information pertaining, for example, to an installation date, a wear condition of a first component, and/or a time-of-usage of the printer/component. The wear condition could be assessed for example by determining a dot resistance in a printhead of a printer. The dot resistance changes gradually over a period of time and changes significantly upon failure of the printhead.

Block 620 of the flowchart 600 pertains to associating the printer with either the first behavioral model or the second behavioral model based on the current physical condition and/or a current operating environment of the printer. The current physical condition and/or a current operating environment of the printer can be obtained by the computing element 400 at any selected instant in time. The selected instant in time can be preset in the memory 430 or can be manually provided to the computing element 400 by a technician for example.

Block 625 of the flowchart 600 pertains to determining from the associated first behavioral model or second behavioral model, a failure statistic of the printer. The failure statistic can be an expected-time-to-failure of a first component of the printer. The computing element 400 can execute this action by utilizing data contained in the table 300 (FIG. 3) for example.

Block 630 of the flowchart 600 pertains to scheduling a replacement of the first component of the printer based on the expected-time-to-failure of the first component. This operation can be executed by the computing element 400 without human intervention. For example, the computing element 400 can automatically place an order or transmit a request to a supply source of the first component (such as a web-based business).

The operations indicated in the flowchart 600 automate the maintenance process and eliminates guesswork, errors, and oversights that can take place when maintenance procedures are executed by humans, particularly when executed upon a large number of printers located in two or more differing environments. The operations indicated in the flowchart 600 also provides cost benefits by eliminating the need for keeping inventory for an unnecessarily long period of time and/or making unnecessary component purchases/replacements on some printers that have a longer MTBF than others, the variations in MTBF attributable to differing environmental conditions in which the various printers are operated.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; 8,740,082;
U.S. Pat. Nos. 8,740,085; 8,746,563;
U.S. Pat. Nos. 8,750,445; 8,752,766;
U.S. Pat. Nos. 8,756,059; 8,757,495;
U.S. Pat. Nos. 8,760,563; 8,763,909;
U.S. Pat. Nos. 8,777,108; 8,777,109;
U.S. Pat. Nos. 8,779,898; 8,781,520;
U.S. Pat. Nos. 8,783,573; 8,789,757;
U.S. Pat. Nos. 8,789,758; 8,789,759;
U.S. Pat. Nos. 8,794,520; 8,794,522;
U.S. Pat. Nos. 8,794,525; 8,794,526;
U.S. Pat. Nos. 8,798,367; 8,807,431;
U.S. Pat. Nos. 8,807,432; 8,820,630;
U.S. Pat. Nos. 8,822,848; 8,824,692;
U.S. Pat. Nos. 8,824,696; 8,842,849;
U.S. Pat. Nos. 8,844,822; 8,844,823;
U.S. Pat. Nos. 8,849,019; 8,851,383;
U.S. Pat. Nos. 8,854,633; 8,866,963;
U.S. Pat. Nos. 8,868,421; 8,868,519;
U.S. Pat. Nos. 8,868,802; 8,868,803;
U.S. Pat. Nos. 8,870,074; 8,879,639;
U.S. Pat. Nos. 8,880,426; 8,881,983;
U.S. Pat. Nos. 8,881,987; 8,903,172;
U.S. Pat. Nos. 8,908,995; 8,910,870;
U.S. Pat. Nos. 8,910,875; 8,914,290;
U.S. Pat. Nos. 8,914,788; 8,915,439;
U.S. Pat. Nos. 8,915,444; 8,916,789;
U.S. Pat. Nos. 8,918,250; 8,918,564;
U.S. Pat. Nos. 8,925,818; 8,939,374;
U.S. Pat. Nos. 8,942,480; 8,944,313;
U.S. Pat. Nos. 8,944,327; 8,944,332;
U.S. Pat. Nos. 8,950,678; 8,967,468;
U.S. Pat. Nos. 8,971,346; 8,976,030;
U.S. Pat. Nos. 8,976,368; 8,978,981;
U.S. Pat. Nos. 8,978,983; 8,978,984;
U.S. Pat. Nos. 8,985,456; 8,985,457;
U.S. Pat. Nos. 8,985,459; 8,985,461;
U.S. Pat. Nos. 8,988,578; 8,988,590;
U.S. Pat. Nos. 8,991,704; 8,996,194;
U.S. Pat. Nos. 8,996,384; 9,002,641;
U.S. Pat. Nos. 9,007,368; 9,010,641;
U.S. Pat. Nos. 9,015,513; 9,016,576;
U.S. Pat. Nos. 9,022,288; 9,030,964;
U.S. Pat. Nos. 9,033,240; 9,033,242;
U.S. Pat. Nos. 9,036,054; 9,037,344;
U.S. Pat. Nos. 9,038,911; 9,038,915;
U.S. Pat. Nos. 9,047,098; 9,047,359;
U.S. Pat. Nos. 9,047,420; 9,047,525;
U.S. Pat. Nos. 9,047,531; 9,053,055;
U.S. Pat. Nos. 9,053,378; 9,053,380;
U.S. Pat. Nos. 9,058,526; 9,064,165;
U.S. Pat. Nos. 9,064,165; 9,064,167;
U.S. Pat. Nos. 9,064,168; 9,064,254;
U.S. Pat. Nos. 9,066,032; 9,070,032;
U.S. Pat. Nos. 9,076,459; 9,079,423;
U.S. Pat. Nos. 9,080,856; 9,082,023;
U.S. Pat. Nos. 9,082,031; 9,084,032;
U.S. Pat. Nos. 9,087,250; 9,092,681;
U.S. Pat. Nos. 9,092,682; 9,092,683;
U.S. Pat. Nos. 9,093,141; 9,098,763;
U.S. Pat. Nos. 9,104,929; 9,104,934;
U.S. Pat. Nos. 9,107,484; 9,111,159;
U.S. Pat. Nos. 9,111,166; 9,135,483;
U.S. Pat. Nos. 9,137,009; 9,141,839;
U.S. Pat. Nos. 9,147,096; 9,148,474;
U.S. Pat. Nos. 9,158,000; 9,158,340;
U.S. Pat. Nos. 9,158,953; 9,159,059;
U.S. Pat. Nos. 9,165,174; 9,171,543;
U.S. Pat. Nos. 9,183,425; 9,189,669;
U.S. Pat. Nos. 9,195,844; 9,202,458;
U.S. Pat. Nos. 9,208,366; 9,208,367;
U.S. Pat. Nos. 9,219,836; 9,224,024;
U.S. Pat. Nos. 9,224,027; 9,230,140;
U.S. Pat. Nos. 9,235,553; 9,239,950;
U.S. Pat. Nos. 9,245,492; 9,248,640;
U.S. Pat. Nos. 9,250,652; 9,250,712;
U.S. Pat. Nos. 9,251,411; 9,258,033;
U.S. Pat. Nos. 9,262,633; 9,262,660;
U.S. Pat. Nos. 9,262,662; 9,269,036;
U.S. Pat. Nos. 9,270,782; 9,274,812;
U.S. Pat. Nos. 9,275,388; 9,277,668;
U.S. Pat. Nos. 9,280,693; 9,286,496;

U.S. Pat. Nos. 9,298,964; 9,301,427;
U.S. Pat. Nos. 9,313,377; 9,317,037;
U.S. Pat. Nos. 9,319,548; 9,342,723;
U.S. Pat. Nos. 9,361,882; 9,365,381;
U.S. Pat. Nos. 9,373,018; 9,375,945;
U.S. Pat. Nos. 9,378,403; 9,383,848;
U.S. Pat. Nos. 9,384,374; 9,390,304;
U.S. Pat. Nos. 9,390,596; 9,411,386;
U.S. Pat. Nos. 9,412,242; 9,418,269;
U.S. Pat. Nos. 9,418,270; 9,465,967;
U.S. Pat. Nos. 9,423,318; 9,424,454;
U.S. Pat. Nos. 9,436,860; 9,443,123;
U.S. Pat. Nos. 9,443,222; 9,454,689;
U.S. Pat. Nos. 9,464,885; 9,465,967;
U.S. Pat. Nos. 9,478,983; 9,481,186;
U.S. Pat. Nos. 9,487,113; 9,488,986;
U.S. Pat. Nos. 9,489,782; 9,490,540;
U.S. Pat. Nos. 9,491,729; 9,497,092;
U.S. Pat. Nos. 9,507,974; 9,519,814;
U.S. Pat. Nos. 9,521,331; 9,530,038;
U.S. Pat. Nos. 9,572,901; 9,558,386;
U.S. Pat. Nos. 9,606,581; 9,646,189;
U.S. Pat. Nos. 9,646,191; 9,652,648;
U.S. Pat. Nos. 9,652,653; 9,656,487;
U.S. Pat. Nos. 9,659,198; 9,680,282;
U.S. Pat. Nos. 9,697,401; 9,701,140;
U.S. Design Patent No. D702,237;
U.S. Design Patent No. D716,285;
U.S. Design Patent No. D723,560;
U.S. Design Patent No. D730,357;
U.S. Design Patent No. D730,901;
U.S. Design Patent No. D730,902;
U.S. Design Patent No. D734,339;
U.S. Design Patent No. D737,321;
U.S. Design Patent No. D754,205;
U.S. Design Patent No. D754,206;
U.S. Design Patent No. D757,009;
U.S. Design Patent No. D760,719;
U.S. Design Patent No. D762,604;
U.S. Design Patent No. D766,244;
U.S. Design Patent No. D777,166;
U.S. Design Patent No. D771,631;
U.S. Design Patent No. D783,601;
U.S. Design Patent No. D785,617;
U.S. Design Patent No. D785,636;
U.S. Design Patent No. D790,505;
U.S. Design Patent No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;

U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;

U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, exemplary embodiments of the invention have been disclosed. The present disclosure is not limited to such exemplary embodiments. For example, it should be understood that a printer is merely one example of a device in the description above can be replaced by various other types of devices without detracting from the spirit of the disclosure. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method comprising:
deriving a first behavioral model based on an operating environment of a first set of printers;
deriving a second behavioral model based on an operating environment of a second set of printers;
determining at least one of a current physical condition or a current operating environment of a printer;
associating the printer with one of the first behavioral model or the second behavioral model based on the at least one of a current physical condition or a current operating environment of the printer;
determining from the associated one of the first behavioral model or the second behavioral model, a failure statistic comprising an expected-time-to-failure of a first component of the printer; and
scheduling a replacement of the first component of the printer based on the expected-time-to-failure of the first component.

2. The method of claim 1, wherein determining the at least one of a current physical condition or a current operating environment of the printer comprises utilizing one or more sensors to detect at least one of a time-of-usage of the first component, an environmental condition, a wear condition of the first component, or a characteristic of a print media installed in the printer.

3. The method of claim 2, wherein the first component is a printhead installed in the printer.

4. The method of claim 1, wherein the first behavioral model is a first predictive model based on a first set of failure statistics of the first set of printers and the second behavioral model is a second predictive model based on a second set of failure statistics of the second set of printers.

5. The method of claim 4, wherein the first set of failure statistics comprises a first mean time between failures (MTBF) of the first set of printers and the second set of failure statistics comprises a second MTBF of the second set of printers.

6. The method of claim 5, wherein the first MTBF is determined, at least in part, on a first environmental condition in which the first set of printers is operated and the second MTBF is determined, at least in part, on a second environmental condition in which the second set of printers is operated.

7. The method of claim 1, wherein the first component is present in each of the first set of printers and further comprising:
defining the first set of printers based, at least in part, on the first component that is present in each of the first set of printers; and
defining the second set of printers based, at least in part, on a second component that is present in each of the second set of printers.

8. A method comprising:
deriving a first behavioral model based on an operating environment of a first set of printers;
deriving a second behavioral model based on an operating environment of a second set of printers;
determining at least one of a current physical condition or a current operating environment of a printer;
associating the printer with one of the first behavioral model or the second behavioral model based on the at least one of a current physical condition or a current operating environment of the printer;
determining from the associated one of the first behavioral model or the second behavioral model, a failure statistic comprising an expected-time-to-failure of a printhead of the printer; and
scheduling a replacement of the printhead of the printer based on the expected-time-to-failure of the first component.

9. The method of claim 8, wherein determining the at least one of a current physical condition or a current operating environment of the printer comprises detecting a time-of-usage of the printhead, an environmental condition, a wear condition of the printhead, or a characteristic of a print media installed in the printer.

10. The method of claim 8, wherein the first behavioral model is a first predictive model based on a first set of failure statistics of the first set of printers and the second behavioral model is a second predictive model based on a second set of failure statistics of the second set of printers.

11. The method of claim 10, wherein the first set of failure statistics comprises a first mean time between failures (MTBF) of the first set of printers and the second set of failure statistics comprises a second MTBF of the second set of printers.

12. The method of claim 11, wherein the first MTBF is determined, at least in part, on a first environmental condition in which the first set of printers is operated and the second MTBF is determined, at least in part, on a second environmental condition in which the second set of printers is operated.

13. The method of claim 8, wherein the printhead is present in each of the first set of printers and further comprising:
defining the first set of printers based, at least in part, on the printhead that is present in each of the first set of printers; and
defining the second set of printers based, at least in part, on a second component that is present in each of the second set of printers.

14. A non-transitory computer-readable storage medium containing instructions executable by a processor for performing operations comprising:
deriving a first behavioral model based on an operating environment of a first set of printers;
deriving a second behavioral model based on an operating environment of a second set of printers;
determining at least one of a current physical condition or a current operating environment of a printer;
associating the printer with one of the first behavioral model or the second behavioral model based on the at least one of a current physical condition or a current operating environment of the printer;
determining from the associated one of the first behavioral model or the second behavioral model, a failure statistic comprising an expected-time-to-failure of a first component of the printer; and
scheduling a replacement of the first component of the printer based on the expected-time-to-failure of the first component.

15. The non-transitory computer-readable storage medium of claim 14, wherein determining the at least one of a current physical condition or a current operating environment of the printer comprises utilizing one or more sensors to detect at least one of a time-of-usage of the first component, an environmental condition, a wear condition of the first component, or a characteristic of a print media installed in the printer.

16. The non-transitory computer-readable storage medium of claim 15, wherein the first component is a printhead installed in the printer.

17. The non-transitory computer-readable storage medium of claim 14, wherein the first behavioral model is a first predictive model based on a first set of failure statistics of the first set of printers and the second behavioral model is a second predictive model based on a second set of failure statistics of the second set of printers.

18. The non-transitory computer-readable storage medium of claim 17, wherein the first set of failure statistics comprises a first mean time between failures (MTBF) of the first set of printers and the second set of failure statistics comprises a second MTBF of the second set of printers.

19. The non-transitory computer-readable storage medium of claim 18, wherein the first MTBF is determined, at least in part, on a first environmental condition in which the first set of printers is operated and the second MTBF is determined, at least in part, on a second environmental condition in which the second set of printers is operated.

20. The non-transitory computer-readable storage medium of claim 14, wherein the first component is present in each of the first set of printers and further comprising:
defining the first set of printers based, at least in part, on the first component that is present in each of the first set of printers; and
defining the second set of printers based, at least in part, on a second component that is present in each of the second set of printers.

* * * * *